Sept. 26, 1939.   H. J. DUNKELOW   2,174,316
CLUTCH MECHANISM
Filed June 7, 1937   2 Sheets-Sheet 1
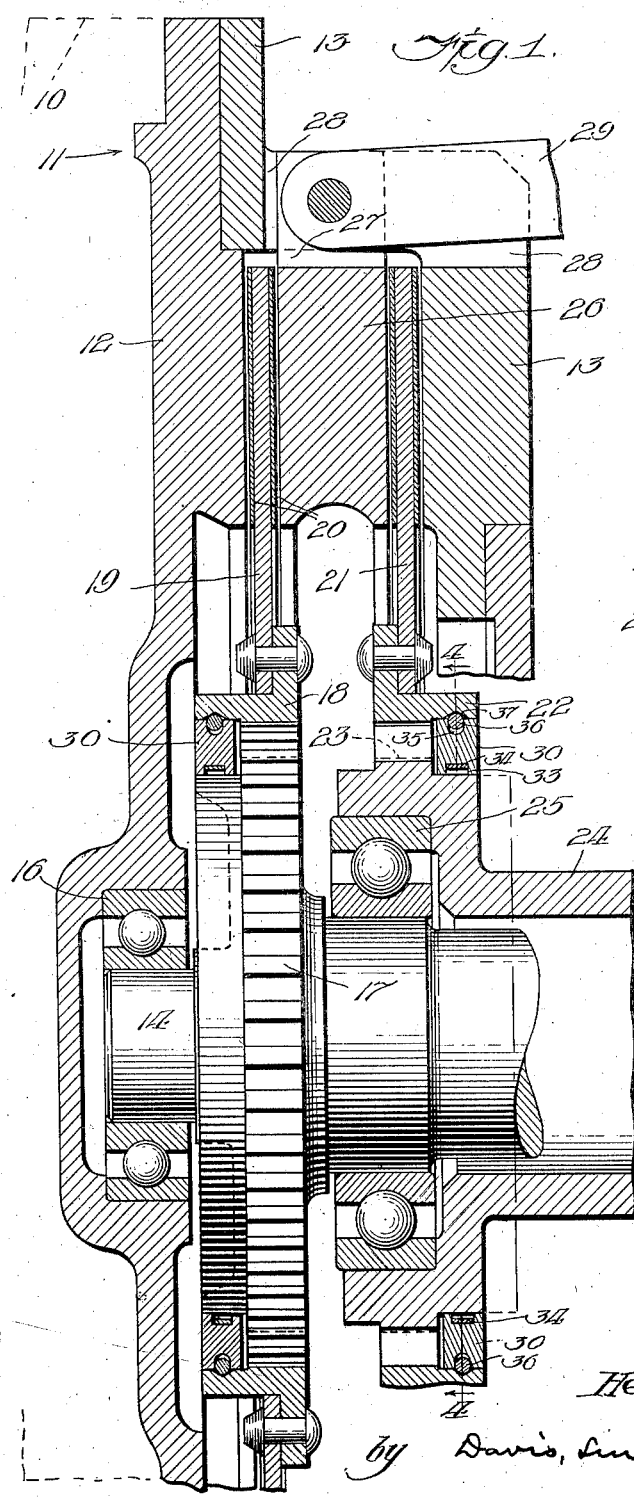
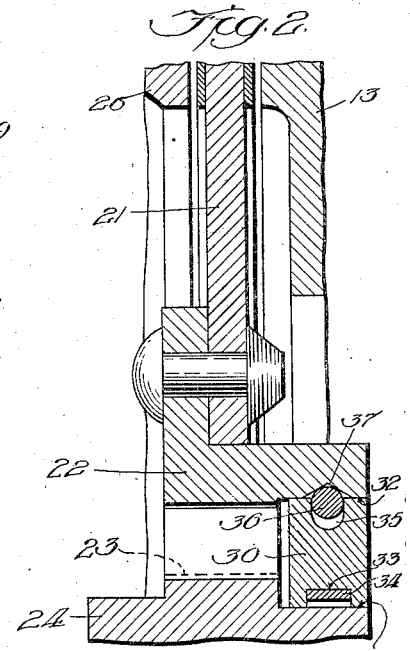
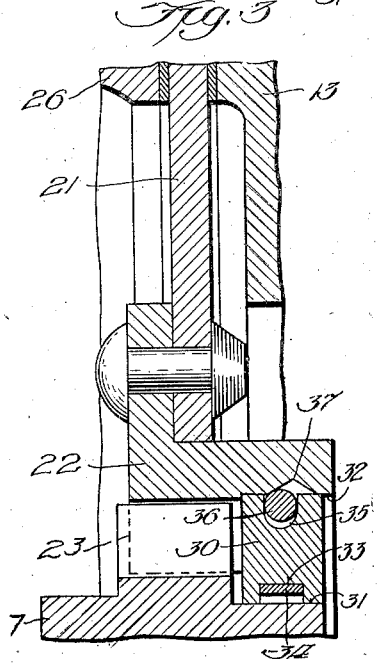
Inventor:
Henry J Dunkelow
by Davis, Lindsey Smith & Shonts
Attys.

Sept. 26, 1939.     H. J. DUNKELOW     2,174,316
CLUTCH MECHANISM
Filed June 7, 1937     2 Sheets-Sheet 2
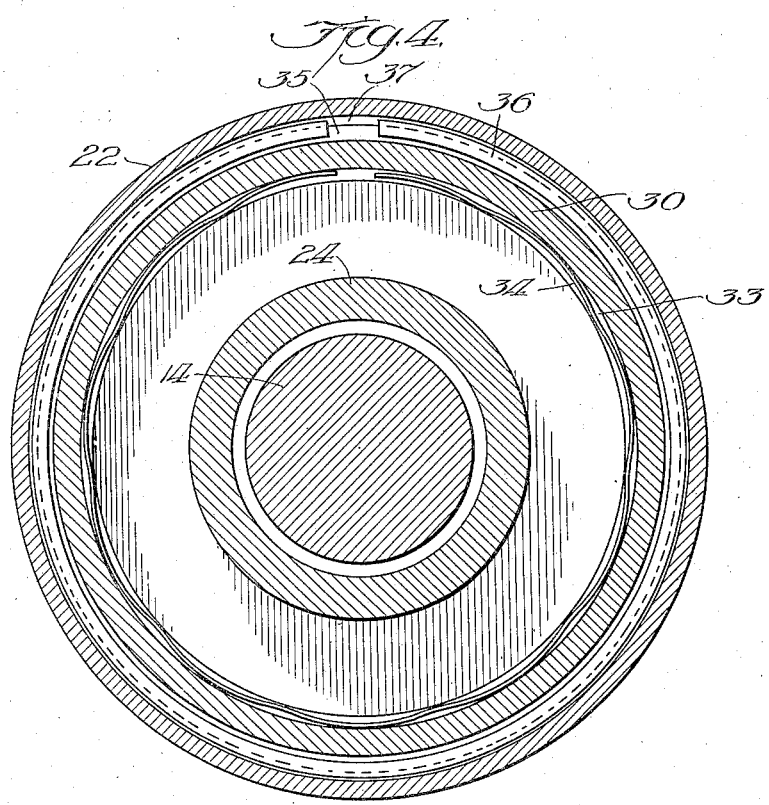
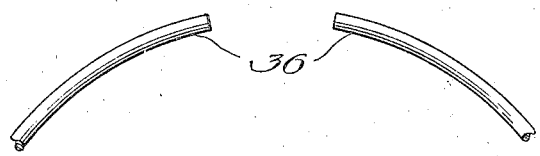
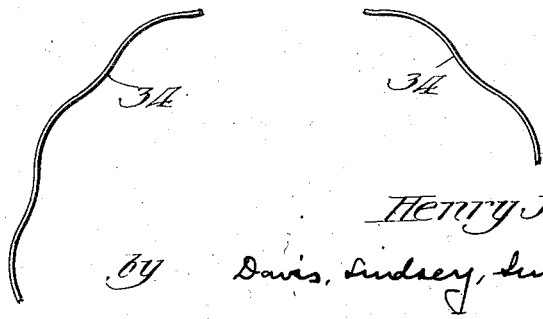

Patented Sept. 26, 1939

2,174,316

UNITED STATES PATENT OFFICE 2,174,316

CLUTCH MECHANISM

Henry J. Dunkelow, Racine, Wis., assignor to Twin Disc Clutch Company, Racine, Wis., a corporation of Wisconsin Application June 7, 1937, Serial No. 146,703

12 Claims. (Cl. 192—68)

My invention relates to clutch mechanisms and more particularly to a centering device for a clutch plate of the floating type which operates to definitely return and hold the plate to and in neutral position after being released from driving engagement with the other clutch parts.

In clutches employing driving or friction plates of the floating type, it is contemplated that such plates will "float free" when the clutch is idling, but the practical aspects of the situation are that the plate does not stay free. On the contrary, it intermittently engages the mating faces of the cooperating clutch members with ensuing wear and friction. This condition is particularly serious in duplex clutches during periods of reversal when certain parts of the clutch are rotating in opposite directions.

It is, therefore, one object of my invention to devise a centering device which automatically returns a floating clutch plate to neutral position when the pressure holding the plate in driving position is released.

A further object is to provide a device of the character indicated which is maintained in operative relation to the associated clutch device within the range of permissible wear of the friction facings on the plate.

These and further objects of my invention will be set forth in the following specification, reference being had to the accompanying drawings, and the novel means by which said objects are effectuated will be definitely pointed out in the claims.

In the drawings:

Figure 1 is a fragmentary, sectional elevation of a clutch of the so-called duplex type showing the application of my improved centering device thereto.

Fig. 2 is an enlarged, sectional elevation of a portion of the mechanism illustrated in Fig. 1 with the parts shown in the same operative relation to each other, and with the clutch or friction plate in neutral position.

Fig. 3 is a view similar to Fig. 2, but showing the friction plate clamped between certain of the clutch members and the position of the centering device under these conditions.

Fig. 4 is a section along the line 4—4 in Fig. 1, looking in the direction of the arrows.

Figs. 5 and 6 are fragmentary elevations showing the two types of springs which are employed in connection with my centering device.

By way of example, my improved centering device will be illustrated and described in connection with the duplex type of clutch mechanism as disclosed in United States Letters Patent No. 2,127,713, dated August 23, 1938. It will be understood, however, that the application of my invention is not restricted to clutches of the indicated character, but is readily adapted to clutches provided with a single floating, friction plate.

Referring to Figs. 1 and 2, the numeral 10 designates a driving member, such as a flywheel, which is suitably connected to a power source (not shown). A clutch casing 11 composed of the separable, complementary parts 12 and 13 is secured to one face of the flywheel in any desired manner.

One end of a driven shaft 14 is journaled in a bearing 16 carried by the casing part 12 and located in axial alignment with the axis of the flywheel, while the opposite end of the shaft is journaled in parts and connected to gearing which more particularly form the subject matter of the above-noted patent.

The shaft 14 is provided with an externally toothed, annular flange 17 that is in constant mesh with similar teeth provided on the inner periphery of a ring 18 to which is secured a friction plate 19 whose opposite sides may be provided with suitable friction facings 20. The nature of the driving connection between the ring 18 and the flange 17 is such as to permit the ring and the attached plate to be readily shifted into driving engagement with the other parts of the clutch mechanism, as hereinafter described, and to also permit its being returned to the neutral position shown in Fig. 1 by the devices hereinafter described.

The plate 19 is located adjacent the inner face of the casing part 12 and a similar friction plate 21 is located adjacent the inner face of the casing part 13. The plate 21 is secured to a ring 22 whose inner periphery is provided with a plurality of teeth 23 which mesh with similar teeth provided on a driven sleeve 24. The sleeve is supported entirely clear of contact with the shaft 14 by means of a bearing 25 at one end that is carried by the shaft 14 and, at the opposite end, it may be supported and connected to gearing as indicated in the aforesaid patent. In the particular arrangement, the shaft 14 may be regarded as a direct drive shaft, while the sleeve 24 may be regarded as a medium for imparting a reverse drive to a suitably driven part.

Power is transmitted from the flywheel 10 to the shaft 14 through the medium of a clutch comprising the casing part 12 and friction plate 19, while power from the flywheel is transmitted to the sleeve 24 through a clutch comprising the casing part 13 and friction plate 21. The friction plates are selectively engaged with their associated casing parts by means of a common clamping member or plate 26 that is located between the plates 19 and 21. Driving engagement between the member 26 and the clutch casing is obtained by means of a plurality of circumferentially spaced lugs 27 which extend outwardly from the periphery of the member through similarly spaced slots 28 cut in the periphery of the casing part 13. The member 26 may be shifted endwise in either direction from the neutral position shown by means of a plurality of links 29, only one of which is illustrated in Fig. 1, one end of each link being pivotally connected to a lug 27 and the opposite end to a suitable operative means, such as that disclosed in the indicated patent.

The structure above-described in and of itself forms no part of the present invention but has been adverted to as indicating one operating environment for my improved centering device which will now be described. Since this centering device is identical for both friction plates, only one need be described and reference hereinafter will be made only to that device which is associated with the friction plate 21.

Referring more particularly to Fig. 2, a ring 30 fits between opposed, annular shoulders 31 and 32 provided, respectively, on the sleeve 24 and ring 22 adjacent the right end faces, as viewed in the figure, of the teeth 23. The ring 30 is provided with an internal, annular groove 33 which is preferably rectangular in cross section and within which is received a parti-circular wave spring 34. An external, annular groove 35, which is preferably U-shaped in cross section, is also provided in the ring 30 and this groove receives a parti-circular ring spring 36 which, when the parts are occupying the position illustrated in Fig. 2, bears equally against the angularly disposed faces of an internal, annular, V-shaped groove 37 formed in the ring 22.

The ring 30 is frictionally held in the position shown by means of the wave spring 34 whose outside diameter when free of restraint is greater than the diameter of the base of the groove 33. Accordingly, when the spring 34 is compressed to facilitate its being seated in the groove 33, its tendency to expand, after the ring 30 is positioned, as illustrated in Fig. 2, exerts such a degree of frictional contact on the shoulder 31 that the ring 30 is definitely held against inadvertent movement, although it is capable of being moved when actuated by a positive force, as hereinafter described. The friction between the wave spring 34 and the surface of the shoulder 31 is further enhanced due to the fact that the depth of the groove 33 is less than the height of each undulation of the wave spring. Hence, when the wave spring is positioned in the groove, not only are its free ends brought closer together, but each undulation is flattened to some extent, so that those portions of the undulations which bear against the shoulder 31 exert a greater pressure thereon than would otherwise be the case. Moreover, the free, outside diameter of the ring spring 36 is greater than the internal diameter of the ring 22 in the region of the shoulder 32. Accordingly, when the ring 30 is occupying the position illustrated in Fig. 2, the spring 36 bears equally against both faces of the groove 37 and so tends to maintain the friction plate 21 in the neutral position shown.

In the operation of the centering device, it will be assumed that the clamping member 26 is moved toward the right to grip the friction plate 21 therebetween and the adjacent face of the casing part 13. During this movement, the left face of the groove 37, as viewed in Fig. 2, compresses the ring spring 36 and moves the same further into its groove 35. When the friction plate 21 has been fully engaged, the parts then occupy the position substantially as illustrated in Fig. 3. This position would generally correspond to that assumed by the parts when the friction facings 20 are new and, in this position, it will be noted that the teeth 23 have just engaged the left side of the ring 30.

When the indicated clutch is released by moving the clamping member 26 to the position illustrated in Fig. 1, the friction plate 21 will be returned to the position also illustrated in the last-noted figure due to the expanding action of the ring spring 36 acting against the left, inclined wall of the groove 37. This returning movement of the friction plate 21 continues until the ring spring 36 contacts the right face of the groove 37, when the friction plate will be definitely centered between the opposing faces of the clamping member 26 and the casing part 13 and definitely free of contact with either face.

It will be noted that, during the foregoing operation, the wave spring 34 maintains the ring 30 in such a position that the ring spring 36 contacts with some portion of the left face of the groove 37, thereby insuring the returning action already described. However, it is important that the centering device be repositioned from time to time as gradual wear of the friction facings occurs, since, under these conditions, it is necessary for the friction plate 21 to be shifted endwise a greater distance than originally.

This result is obtained automatically by the engagement of the end faces of the teeth 23 with the adjacent side of the ring 30. As the friction facings gradually wear, the teeth 23 gradually shift the ring 30 into new positions such that the ring spring 36 will always engage with some portion of one wall of the groove when the friction plate is shifted to driving position.

The centering device also compensates for any differences in the relative positions of the sleeve 24 and the ring 22 that may be due to manufacturing discrepancies, tolerances, etc.

My improved centering device is not restricted to the duplex construction shown, but, obviously, is readily adaptable to clutches provided with single plates and is particularly useful with those types of clutches whose mating faces may be rotating in opposite directions during conditions of reversal.

I claim:

1. In clutch mechanism, the combination of a rotatable member, a clutch plate connected to the member and shiftable relative thereto for engagement with parts of a clutch, means frictionally held on the member for returning the plate to neutral position when the plate is released, and a part on the plate for shifting the means as the faces of the plate wear to maintain the operative relation of the means and plate.

2. In clutch mechanism, the combination of a rotatable member, a friction plate connected to the member and shiftable relative thereto for engagement with parts of a clutch, means for returning the plate to neutral position when the plate is released including an annular V-shaped groove on the plate and a ring spring carried by the member and engageable with the walls of the groove, and means for maintaining the operative relation of the spring and groove as the faces of the plate wear.

3. In clutch mechanism, the combination of a rotatable member, a friction plate connected to the member and shiftable relative thereto for engagement with parts of a clutch, a ring frictionally held on the member and including an external, annular groove, a ring spring mounted in the groove and acting against an inclined surface on the plate to return the same to neutral position when released, and a part on the plate for shifting the ring as the faces of the plate wear to maintain the operative relation of the spring and surface.

4. In clutch mechanism, the combination of a rotatable member, a friction plate connected to the member and shiftable relative thereto for engagement with parts of a clutch, a ring mounted on the member and including internal and external, annular grooves, a ring spring mounted in the external groove and acting against an inclined surface on the plate to return the same to neutral position when released, a wave spring mounted in the internal groove for frictionally engaging the member to maintain the position of the ring, and a part on the plate for shifting the ring as the faces of the plate wear to maintain the operative relation of the ring and surface.

5. In clutch mechanism, the combination of a rotatable member, a clutch plate connected to the member and shiftable relative thereto for engagement with parts of a clutch, a ring carried by the member and including an external, annular groove, and a ring spring mounted in the groove and engageable with the walls of an internal, annular, V-shaped groove provided on the plate to maintain the latter in neutral position and acting to return the plate to neutral position when released from engagement with the clutch parts.

6. In clutch mechanism, the combination of a rotatable member, a clutch plate connected to the member and shiftable relative thereto for engagement with parts of a clutch, a ring mounted on the member and including internal and external, annular grooves, a ring spring mounted in the external groove and engageable with the walls of an internal, annular, V-shaped groove provided on the plate to maintain the latter in neutral position and acting to return the plate to neutral position when released from engagement with the clutch parts, and a wave spring mounted in the internal groove and frictionally contacting the member for maintaining the position of the ring.

7. In clutch mechanism, the combination of a rotatable member, a friction plate connected to the member and shiftable relative thereto for engagement with parts of a clutch, means for returning the plate to neutral position when the plate is released including a depression on the plate and spring means carried by the member and engageable with an inclined wall defining a portion of the depression, and means for maintaining the operative relation of the spring means and depression as the faces of the plate wear.

8. In clutch mechanism the combination of a rotatable member, a clutch plate connected to the member and shiftable relative thereto for engagement with parts of a clutch, means held on the member against inadvertent movement axially of the clutch and coacting with the plate for returning the same to neutral position when the plate is released, and a part on the plate for shifting the means as the faces of the plate wear to maintain the operating relation of the means and plate.

9. In clutch mechanism, the combination of a rotatable member, a friction plate connected to the member and shiftable relative thereto for engagement with parts of a clutch, means for returning the plate to neutral position when the plate is released comprising a spring carried by the member and acting directly against an inclined face provided on the plate, and means for maintaining the operative relation of the spring and face as the faces of the plate wear.

10. In clutch mechanism, the combination of a rotatable member a clutch plate connected to the member and shiftable relative thereto for engagement with parts of a clutch, a ring carried by the member, spring means carried by the ring and acting against an inclined face provided on the plate to maintain the latter in neutral position and acting to return the plate to neutral position when released from engagement with the clutch parts.

11. In clutch mechanism, the combination of a rotatable member, a clutch plate connected to the member and shiftable relative thereto for engagement with parts of a clutch, a ring mounted on the member, first spring means carried by the ring and acting against an inclined face provided on the plate to maintain the latter in neutral position and acting to return the plate to neutral position when released from engagement with the clutch parts, and second spring means carried by the ring and frictionally contacting the member for maintaining the position of the ring.

12. In clutch mechanism, the combination of a rotatable member, a clutch plate connected to the member and shiftable relative thereto for engagement with parts of a clutch, and means frictionally held on the member and having a spring device coacting with the plate for returning the same to neutral position when the plate is released, the means being adjustable axially of the mechanism as the faces of the plate wear to maintain the operative relation of the spring device and plate.

HENRY J. DUNKELOW.